(12) United States Patent
Ozekinci et al.

(10) Patent No.: US 7,752,211 B1
(45) Date of Patent: Jul. 6, 2010

(54) ADAPTIVE INDEX PROCESSING

(75) Inventors: Yasemin Ugur Ozekinci, Burlington (CA); Thomas Papadakis, Burlington (CA)

(73) Assignee: EMC Corporation, Hopkinton, MA (US)

( * ) Notice: Subject to any disclaimer, the term of this patent is extended or adjusted under 35 U.S.C. 154(b) by 307 days.

(21) Appl. No.: 11/242,514

(22) Filed: Sep. 30, 2005

(51) Int. Cl.
*G06F 19/00* (2006.01)

(52) U.S. Cl. .................. 707/755; 707/778; 707/791

(58) Field of Classification Search .............. None
See application file for complete search history.

(56) References Cited

U.S. PATENT DOCUMENTS

| | | | |
|---|---|---|---|
| 4,358,825 A | | 11/1982 | Kyu et al. |
| 5,040,179 A | | 8/1991 | Chen |
| 5,768,526 A | | 6/1998 | Fawcett |
| 5,887,159 A | | 3/1999 | Burrows |
| 5,893,087 A | * | 4/1999 | Wlaschin et al. ............ 707/3 |
| 5,909,695 A | | 6/1999 | Wong et al. |
| 5,978,791 A | * | 11/1999 | Farber et al. .................. 707/2 |
| 6,128,623 A | * | 10/2000 | Mattis et al. ............ 707/103 R |
| 6,189,046 B1 | | 2/2001 | Moore et al. |
| 6,223,343 B1 | * | 4/2001 | Hopwood et al. ........... 717/101 |
| 6,249,782 B1 | | 6/2001 | Day et al. |
| 6,260,044 B1 | * | 7/2001 | Nagral et al. ............... 707/102 |
| 6,278,992 B1 | * | 8/2001 | Curtis et al. .................. 707/3 |
| 6,289,358 B1 | * | 9/2001 | Mattis et al. ................ 707/203 |
| 6,292,880 B1 | * | 9/2001 | Mattis et al. ................ 711/216 |
| 6,453,319 B1 | * | 9/2002 | Mattis et al. ................ 707/100 |
| 6,457,029 B1 | * | 9/2002 | Switzer, Jr. ................ 715/209 |
| 6,529,146 B1 | * | 3/2003 | Kowalski et al. .............. 341/50 |
| 6,611,609 B1 | * | 8/2003 | Zhu ........................... 382/103 |
| 6,611,850 B1 | * | 8/2003 | Shen ......................... 707/204 |
| 6,633,892 B1 | * | 10/2003 | Chan et al. .................. 707/204 |
| 6,778,979 B2 | * | 8/2004 | Grefenstette et al. ........... 707/3 |
| 6,820,075 B2 | * | 11/2004 | Shanahan et al. .............. 707/3 |
| 6,895,507 B1 | | 5/2005 | Teppler |
| 6,928,425 B2 | * | 8/2005 | Grefenstette et al. ........... 707/2 |
| 6,985,901 B1 | * | 1/2006 | Sachse et al. ................. 707/10 |
| 7,085,271 B2 | | 8/2006 | Gooch |
| 7,130,445 B2 | | 10/2006 | Ruhl et al. |

(Continued)

OTHER PUBLICATIONS

G. H. Gonnet, R. Baeza-Yates, Handbook of Algorithms and Data Structures, 1991, 2nd edition, pp. 47-48, Addison-Wesley Pub. Co., Wokingham, England and Readking, Mass.

(Continued)

*Primary Examiner*—Charles Rones
*Assistant Examiner*—Kurt Mueller
(74) *Attorney, Agent, or Firm*—Theodore A. Chen; Krishnendu Gupta

(57) ABSTRACT

A method, article of manufacture, and apparatus for tracking a plurality of objects being stored are disclosed. In an embodiment, this comprises determining an application associated with the objects being stored, selecting a hint or longest pathname containing the plurality of objects, and storing the selection in the index. The hint may be generated by concatenating at least a portion of a name of each object being stored into the hint, concatenating hash values of the names of the objects, or producing a bitmap of hash values of the names of the objects, depending on available space. In an embodiment, each hint generation may be tried in succession based on determining whether the previous hint fits into the space available for storing the hint.

19 Claims, 12 Drawing Sheets

U.S. PATENT DOCUMENTS

| | | | |
|---|---|---|---|
| 7,159,070 | B2 | 1/2007 | Kilian et al. |
| 7,181,731 | B2 | 2/2007 | Pace et al. |
| 7,280,055 | B2 | 10/2007 | Drasny |
| 2001/0002485 | A1* | 5/2001 | Bisbee et al. ............... 713/167 |
| 2002/0052884 | A1* | 5/2002 | Farber et al. ............. 707/104.1 |
| 2002/0087588 | A1* | 7/2002 | McBride et al. ............ 707/204 |
| 2002/0120639 | A1* | 8/2002 | Basin et al. ................. 707/204 |
| 2002/0184244 | A1* | 12/2002 | Hsiao et al. ................. 707/201 |
| 2003/0005103 | A1 | 1/2003 | Narad et al. |
| 2003/0046260 | A1* | 3/2003 | Satyanarayanan et al. ...... 707/1 |
| 2003/0051236 | A1 | 3/2003 | Pace et al. |
| 2003/0195904 | A1* | 10/2003 | Chestnut et al. ............ 707/204 |
| 2003/0208493 | A1* | 11/2003 | Hall et al. .................. 707/100 |
| 2003/0233401 | A1* | 12/2003 | Dean ......................... 709/202 |
| 2004/0098383 | A1* | 5/2004 | Tabellion et al. ............... 707/3 |
| 2004/0139098 | A1* | 7/2004 | Margolus et al. ........... 707/100 |
| 2004/0199516 | A1* | 10/2004 | Thames et al. .............. 707/100 |
| 2005/0004993 | A1 | 1/2005 | Miller et al. |
| 2005/0086241 | A1* | 4/2005 | Ram et al. ................... 707/100 |
| 2005/0125627 | A1 | 6/2005 | Kilian et al. |
| 2005/0257062 | A1* | 11/2005 | Ignatius et al. .............. 713/176 |
| 2006/0184556 | A1 | 8/2006 | Tan et al. |
| 2006/0236074 | A1 | 10/2006 | Williamson et al. |
| 2007/0052563 | A1 | 3/2007 | Drasny |
| 2007/0185914 | A1* | 8/2007 | Prahlad et al. .............. 707/200 |
| 2008/0114839 | A1* | 5/2008 | Borgendale ................. 709/206 |

OTHER PUBLICATIONS

M.T. Goodrich, R. Tamassia, Data Structures and Algorithms in Java, 1997, pp. 118-119, Wiley Pub. Co., New York.

U.S. Appl. No. 11/242,179, Ozekinci, Yasemin Ugur et al., Notice of Allowance Received Sep. 30, 2009.

* cited by examiner

200 → index header

| timestamp | savepoint | pointer to list of items in saveset |
|---|---|---|
| 202 → | /foo/bar | |
| 204 → | / | |
| 206 → | /foo | |
| 208 → | /bob | |
| 210 → | NULL | |
| 212 → | NULL | |
| 214 → | NULL ⋮ | |
| 216 → | /olatom:/olatom/o/ | |
| | ⋮ | |
| 218 → | /Rocky/node0001 | |
| | ⋮ | |

FIG. 2

| Flag | Oracle full | Oracle Monday | Oracle Tuesday ... |
|------|-------------|---------------|--------------------|

FIG. 3A

| Flag | hash (Oracle full) | hash (Oracle Monday) | ······· |
|------|--------------------|----------------------|---------|

FIG. 3B

| Flag | | | | | | | ········· | | | |
|------|---|---|---|---|---|---|---|---|---|---|
| | 0 | 1 | 2 | 3 | 4 | 5 | ········· | K−2 | K−1 | K |

FIG. 3C

| a | b | c | d |
|---|---|---|---|

FIG. 11a

| a' | b' | c' | d' | e' |
|---|---|---|---|---|

FIG. 11b

| 0 | 0 | 0 | 1 |
|---|---|---|---|

FIG. 11c

| 1 | 3 | 3 | 1 | 0 |
|---|---|---|---|---|

FIG. 11d

| 1 | 3 | 3 | 1 | 255 |
|---|---|---|---|---|

FIG. 11e

ADAPTIVE INDEX PROCESSING

CROSS-REFERENCE TO RELATED APPLICATIONS

This application claims priority to co-pending U.S. patent application Ser. No. 11/174,070 for SYSTEM AND METHOD FOR INDEX PROCESSING, filed Jun. 30, 2005, which is incorporated herein by reference for all purposes; and to co-pending U.S. patent application Ser. No. 11/174,083 for IMPROVED INDEX PROCESSING, filed Jun. 30, 2005, which is incorporated herein by reference for all purposes; and to co-pending U.S. patent application Ser. No. 11/173,910 for EFFICIENT INDEX PROCESSING, filed Jun. 30, 2005, which is incorporated herein by reference for all purposes. This application is related to co-pending U.S. patent application Ser. No. 11/242,218 for INDEX PROCESSING FOR LEGACY SYSTEMS filed Sep. 30, 2005, which is incorporated herein by reference for all purposes; and co-pending U.S. patent application Ser. No. 11/242,179 for INDEX PROCESSING filed Sep. 30, 2005, which is incorporated herein by reference for all purposes.

FIELD OF THE INVENTION

This invention relates generally to index processing, and more particularly to index processing for backup and/or restore.

BACKGROUND

This invention relates to backing up and/or restoring objects (such as in the form of files) on an object storage system (such as a file system). File systems are typically backed up to a backup storage on a regular basis, and in performing backups or retrievals, it is desirable to quickly locate a backup file. Information about backup files may be stored in an index for rapid searching, so that the backup system does not have to search the entire backup storage. A set of data being backed up in a backup operation (e.g., a grouping of files and/or directories to be backed up) may be referred to herein as a "saveset".

The index, sometimes referred to herein as "client file index", stores information about the savesets. When it is desired to determine what has been backed up, such as during retrieval, the index may be used to facilitate lookup. However, storage systems often contain large numbers of objects, and it would not be unusual for a storage system to contain hundreds of thousands, or millions, of objects. Even with the use of an index, a straightforward search of the index for backup objects can be unwieldy and slow.

There is a need, therefore, for an improved method, article of manufacture, and apparatus for efficiently locating backup files.

BRIEF DESCRIPTION OF THE DRAWINGS

The present invention will be readily understood by the following detailed description in conjunction with the accompanying drawings, wherein like reference numerals designate like structural elements, and in which:

FIG. 2 illustrates an embodiment of an index header file;

FIG. 3A illustrates an embodiment of an entry in the index header file using concatenation;

FIG. 3B illustrates an embodiment of an entry in the index header file using concatenation of hashed values;

FIG. 3C illustrates an embodiment of an entry in the index header file using a bitmap of hashed values;

FIGS. 11a-11e illustrate byte sequences representing a hash value;

DESCRIPTION OF THE INVENTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a system configured to perform backups of application data, but it should be understood that the principles of the invention are not limited to backing up applications. Rather, they may be applied to backups of filesystems, and any system in which it is desirable to quickly locate stored objects, and may be applied to systems configured to store objects, such as database storage systems that store data as BLOBS. They are useful in backup of objects created by applications, such as databases, that do not use the same naming or browsing characteristics as filesystems. Disclosed herein are a method and system to efficiently locate object names in a large index of records containing object names.

Figure 1:
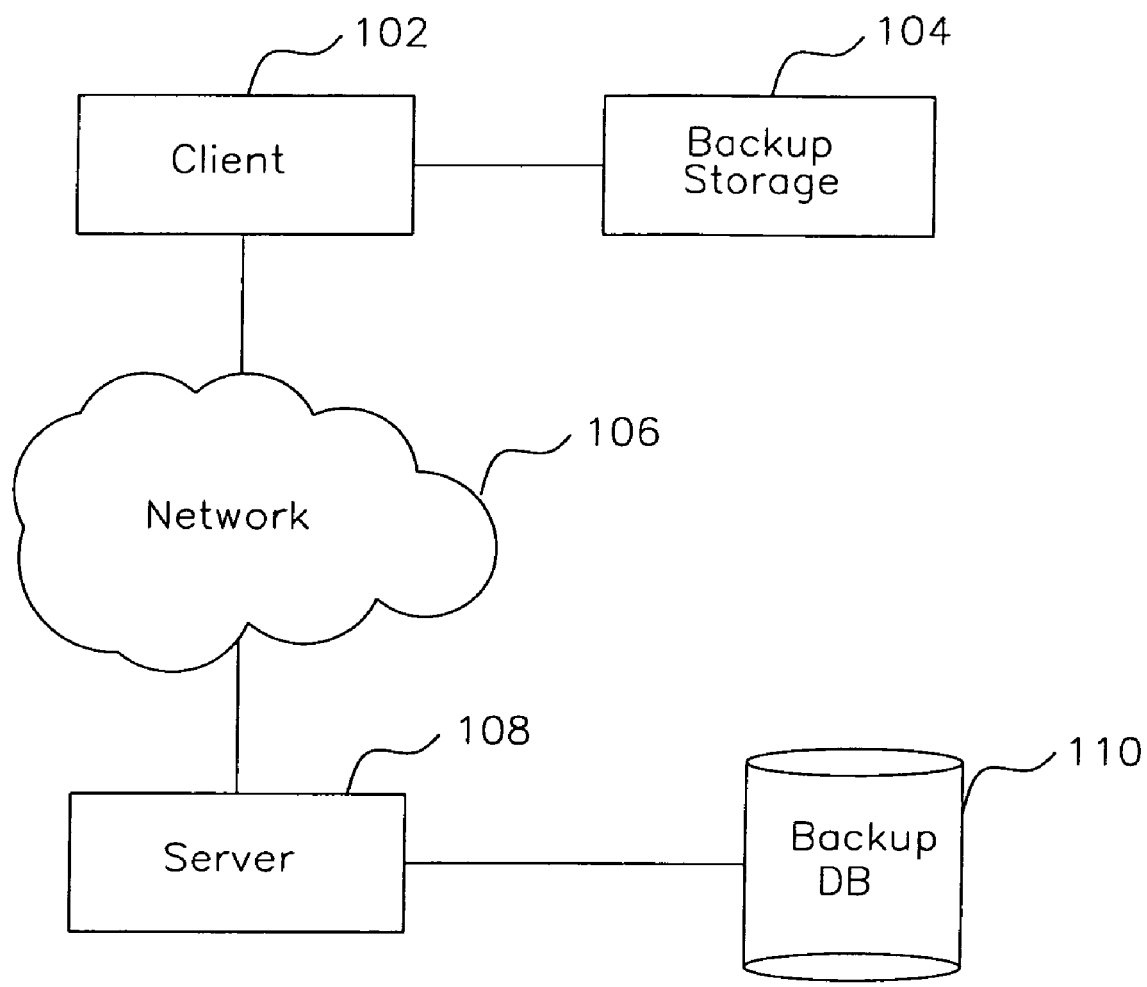
FIG. 1 illustrates an embodiment of a backup system environment.

An embodiment of a backup system environment is shown in FIG. 1. As shown, client 102 is connected to server 108 through network 106. Any number of clients and servers may be connected to the network. The network may be any public or private network and/or combination thereof, including without limitation an intranet, LAN, WAN, and other forms of connecting multiple systems and or groups of systems together. Client 102 is connected to backup storage 104. In some embodiments, the backup storage may comprise one or more of the following: hard drive, tape drive, optical storage unit, and any non-volatile memory device. More than one backup storage 104 may be used. In an embodiment, backup storage 104 is connected directly to the network. In another embodiment, backup storage 104 is connected to server 108. In another embodiment, backup storage 104 is connected to client 102 through a SAN (Storage Area Network). Any or all of these configurations may be used in an embodiment. Backup database 110 is connected to server 108. In an embodiment, backup database 110 contains data associated with data on one or more clients and/or servers. In another embodiment, backup database 110 contains data associated with data written to one or more backup media. In another embodiment, backup database 110 is directly connected to the network. In another embodiment, backup database 110 is connected to client 102. In another embodiment, backup database 110 is a part of server 108 and/or client 102. In an embodiment, backup of client 102 is coordinated by server 108. Server 108 instructs the client to backup data to backup storage 104. When the data is successfully written to the backup storage 104, a record is made on backup database 110. In another embodiment, server 108 cooperates with a backup agent running on client 102 to coordinate the backup. The backup agent may be configured by server 108.

A set of data being backed up in a backup operation (e.g., a grouping of files and/or directories to be backed up) may be referred to herein as a "saveset". The saveset may be preconfigured, dynamically configured, specified through a user interface, set to any first level of data, and/or determined in some other way. The saveset can be any data structured in a hierarchy such as data organized as a tree, a directory, an array, and/or a linked list. The current backup directory is a directory associated with data the process is currently backing up. The current backup directory can be preconfigured, dynamically configured, and/or specified through a user interface to be any data point in the processing data. An individual save file in a saveset stream may be referred to as a "backup item". For file systems, a backup item is a file. A backup item could also be a file that belongs to a database system, or an opaque data blob generated by the database system itself. To facilitate efficient location and retrieval of backup items, information about the saveset may, in one embodiment, be stored in a client file index.

In an embodiment, the client file index is used to determine what has already been backed up. There are no constraints on what client file index lookups may be used for. For example, an index lookup may be used in the following instances:

A user who wants to restore a file may examine the client file index, to determine which file was backed up when, so that he/she can request the correct version of the file to be restored to disk.

During an incremental backup, a program accesses the client file index, to determine which file was backed up when, so that it can determine whether the version of a file currently on disk has to be backed up or not.

An application may want to enforce the constraint that each backup name has to be unique. In such a case, before the actual backup starts, the application will query the client file index to determine whether such a backup name already exists; if such a name exists, it will not perform the backup. Oracle is such an application, i.e. Oracle performs a client file index query before each backup.

Once the last byte of a backup has been transferred from disk to tape, an application may want to "double-check that everything has been done right" by making client file index lookup for the just-finished backup; if this client file index lookup is unsuccessful, the application will consider the backup as "never done". Oracle is such an application; i.e. Oracle performs a client file index query after each backup (in addition to performing a client file index query before each backup).

To facilitate lookup, the client file index may contain information about several savesets. In an embodiment, a "record file" may be used to store information about backup items in a saveset.

In an embodiment, a high-level structure, called an "index header", could contain summarized descriptions of each saveset. These summarized descriptions may be referred to herein as "saveset descriptors". In an embodiment, each record file may be indexed by filename in a "filename key file" and/or by fileid, which is stored in a "fileid key file".

In an embodiment, "savepoint" information may be stored for each saveset as part of the saveset descriptor. The savepoint information may comprise the longest common prefix of all the backup items in the saveset; e.g., in a file system, the savepoint may indicate the lowest-level directory that contains all of the backup items in the saveset. This may be determined at the time that the backup is performed. The savepoint information may be used to accelerate lookups in the client file index, by facilitating the elimination of savesets whose savepoints do not indicate a pathname that could contain the backup item being sought.

The index header and the key files may be regarded as two layers of indexing on top of the record files, facilitating the search for a backup item. The top layer (index header) finds the candidate savesets which may contain the backup item being looked up; the search at this layer is performed using the savetime (provided by the query) and/or the savepoint (prefix-matching the object's name provided by the query) fields of the savesets descriptors; the search is always performed within a certain namespace (provided by the query, and refers to the name of the application that wrote these backups; e.g. Oracle, Sybase, Filesystem). For each candidate saveset resulting from the index header search, a lower layer (filename or fileid key) is employed to quickly search for the backup item name within the candidate saveset.

An example of a lookup is illustrated in FIG. 2. In this example, suppose that a system (such as a backup system) is searching for /foo/bar/sample.txt, which is the target. The index header contains several entries 202-210, with savepoints recorded for each. Entry 202 shows the savepoint as /foo/bar, which could contain the target. Similarly, entries 204 and 206 show savepoints of /and /foo, which could also contain the target. Each of these is considered to be a candidate saveset in which the target may be found. However, entry 208 has savepoint of /bob which could not contain the target, so it is eliminated from consideration. The index header may also contain a pointer to the filename key file for each saveset. Each of these filename key files will be searched for the target. The foregoing steps may be performed in any order, and some or all of these steps may be performed, depending on the application. For example, if a negative lookup is being performed, a backup item is looked up to ensure that this object name does not exist in the index(es), and all candidates will need to be examined. In another example, when a file is being recovered, the system searches for the most recent saveset and the index search ends when the search locates the first backup item with the required characteristic(s). Timestamp information indicating the savetime of the saveset may also be included in the index header, and a query could specify a savetime range to limit the search.

This is an efficient method for finding target files in regular file system backup entries such as /foo/bar/sample.txt. However, many databases and applications do not have file-like names (e.g. orc1816_full_5uf5pj99), or they may use the same naming prefix for many different objects. The client file index queries may also not significantly limit the savetime (timestamp) range. For example, Oracle, Informix, and DB2 typically specify only the backup item name, and not the savetime. As a result, the timestamp and savepoint fields in the index header files may not provide enough information to select candidates or eliminate candidates from consideration. For example, Oracle backup items are opaque data streams, passed by Oracle to the backup system, and the savepoints will be empty, as shown in FIG. 2 as entries 210, 212, and 214 (savepoint=NULL). Informix and DB2 generate huge numbers of identical savepoints because their directory names use the name of the database instance; e.g. /olatom:/olatom/0/(olatom is the Informix database instance name), and /ROCKY/NODE0001/(ROCKY is the DB2 database name, NODE0001 is the DB2 Node#). These are shown by respective entries 216 and 218 in FIG. 2.

This is essentially the worst-case scenario of the above-described search algorithm. The client file index query does not provide a savetime, and the savepoint is either empty or "not distinctive" (i.e. saveset descriptors of many different backup items have the identical savepoint; information). In such a case, the above search algorithm degenerates into a linear search on the entire index header file, examining (i.e. opening, processing, and closing) the key file or even the record file of every saveset of the index header that belongs to the namespace provided by the query. Because a client file index may contain thousands of savesets per namespace, such a worst-case performance is unacceptably slow even in moderately sized environments.

To improve the efficiency of the search, a "hint" may be provided, which would contain search optimization information. In an embodiment, search optimization information for the savesets may be provided, included in the client file index or provided separately from the client file index, and associated with the savesets in the client file index. In an embodiment, the search optimization information may be provided in a new field in the index header file. In an embodiment, the search optimization information may be provided in the savepoint field of the saveset descriptor in the index header file. This approach may be used to integrate seamlessly with existing client file indices.

In one embodiment, search optimization information may be generated at storage time, such as when a backup is being made. An optimization algorithm may be used to generate the search optimization information from the backup item names being stored under a saveset, and this information may be saved as a savepoint. As mentioned above, the search optimization information may be stored separately or in another field.

Any of several optimization algorithms may be appropriate, and several embodiments will be discussed herein. It should be understood, however, that the principles of the invention are not limited to the specific algorithms disclosed herein, and other optimization algorithms may be used. In one embodiment, several optimization algorithms may be used, with a flag or flags to indicate the use of an optimization algorithm and/or which one is being used.

In an embodiment, a hint could involve concatenation of backup items (such as files) into the savepoint. The length of each item name may be stored, or delimiters may be used between names. Concatenation may be done in a sequential fashion as backup item names are determined, or some other ordering may be used, such as ordering by most recently modified or accessed. FIG. 3A illustrates an embodiment of the concatenation approach. Other methods of concatenation may include storing the first n characters, last n characters, or every $k^{th}$ character, of backup item names, where n and k are calculated using the number of objects in the saveset and the savepoint maximum size. In this approach, the savepoint maximum size would be divided by the number of objects in the saveset to determine the amount of space to be used for each item name in the concatenation.

In an embodiment, the savepoint might have space for 1010 characters allocated to it, 10 of which are used to store the identification of the hint, hint parameters, and other useful information. Then for example, a saveset might consist of 50 objects, such that the concatenation of their names is 2000 chars long. In this case, the system might decide to store the first 20 chars of the name of each object (for a total of 1000 chars) as well as the hint identification, and the numbers "1" and "20" indicating that it has stored every char of the first chars of each backup object name. Alternatively, the system might decide to store every second character of the first 40 chars of name of each object (for a total of 1000 chars) as well as the hint identification, and the numbers "2" and "40" indicating that it has stored every second char of the first 40 chars of each backup object name.

Increasing the number of characters allowed for an item name in the concatenation reduces the risk of collisions between two distinct item names that produce the same item name for concatenation, such as when the first or last n characters or every $k^{th}$ characters are used to represent the original item name in the concatenation.

In an embodiment, the store process is iterative, backup item names are kept in memory or other storage location, and when the number of backup items is known, such as at the end of the backup process, the lengths of the item names to use in the concatenation can be calculated. The backup item names are then processed to form the names for the concatenation and concatenated. The resulting concatenation may then be stored in the savepoint field along with a flag to indicate the hint used, as well as information about the concatenation. This approach is advantageous when the saveset contains a relatively small number of backup items.

Figure 4:
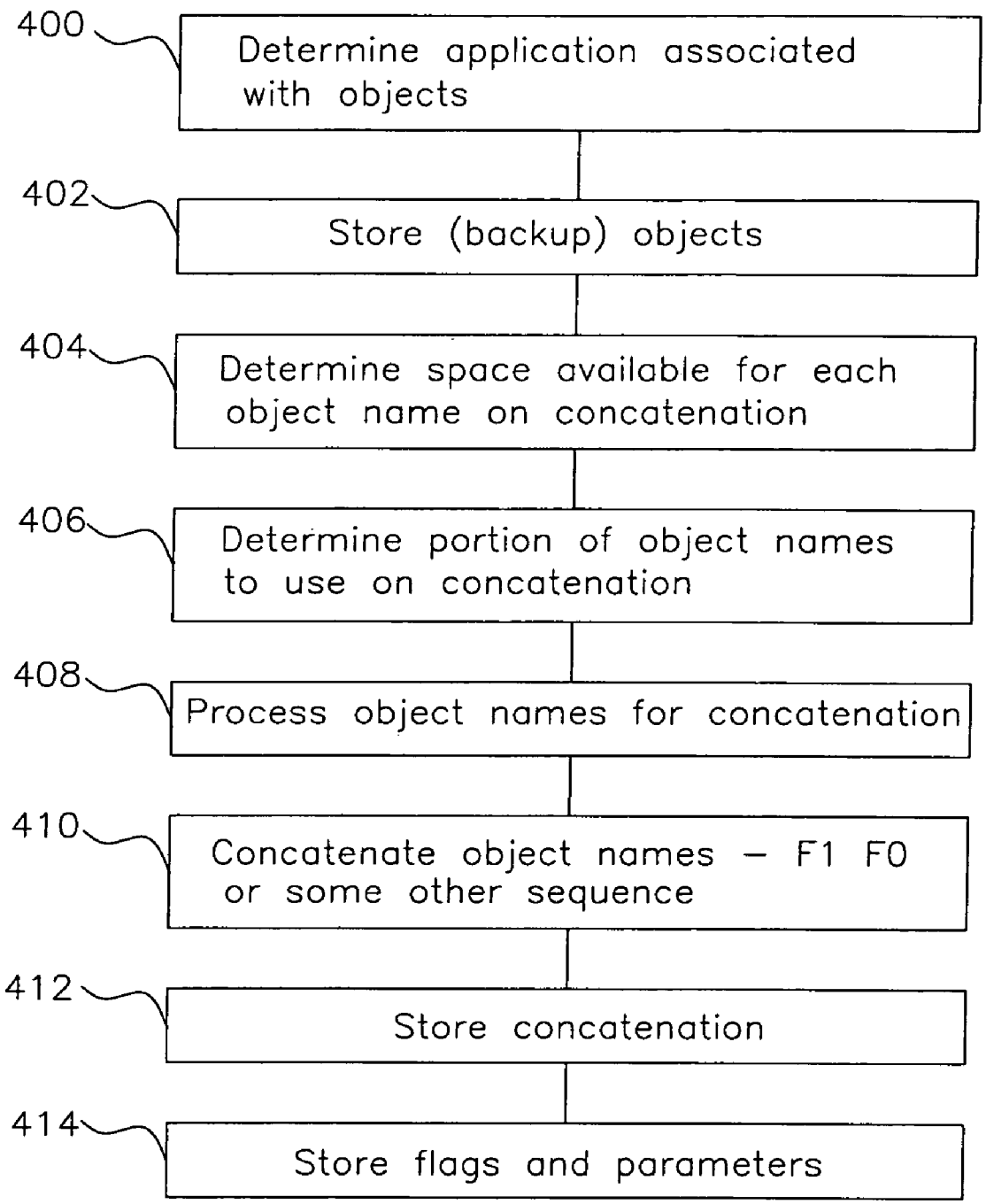
FIG. 4 is a flowchart illustrating a process for producing a hint using concatenation of object names.

FIG. 4 illustrates an embodiment of the process. In step 400, it is determined what application is associated with the objects. This can be performed at other stages of the process, and this determination may be implicit; i.e., a backup client 102 may be application-specific and already know what kind of objects it is processing. The backup is performed, step 402, and the space available for each object name in the concatenation is calculated, step 404. The process determines the portion of object names to use in the concatenation, step 406. This determination may be made based on the amount of space available for each object name, and take into account the application associated with the objects. The process may choose to store the entire object name, the first n characters, the last n characters, every nth character, or other method of choosing characters from the object name. The object names are then processed for concatenation (i.e. the first n characters, last n characters, or other characters, are selected), step 408, and the processed object names are concatenated, step 410. They may be concatenated in first-in, first-out order or some other sequence such as an ordering based on most recent use or modification. In step 412, the concatenation is stored as a hint. The hint may be stored in the index header file in place of the savepoint or in another part of the descriptors for the saveset. Flags may be included with the hint to indicate what type of hint was used and the parameters, step 414.

The flags may be used during lookup to determine what kind of hint/search optimization information was provided. In an embodiment, savepoint information for a candidate saveset is retrieved from the savepoint field in the index header file. If the search optimization information is stored in another field, or in another file, it may be retrieved from that location. The hint may include a flag or flags indicating what optimization algorithm was used, and information about the parameters may be retrieved as well. If a flag indicates that concatenation was used, the lookup process may search the savepoint information for a match to a target (a backup item being sought). If the flags indicate that the first n characters, last n characters, every k-th character, etc. was used to produce the item name for concatenation, then the name of the target will be processed to produce the name as it would be used in the concatenation. Information necessary to produce the concatenation name, such as n and/or k, may be retrieved from the savepoint information. The savepoint information will be searched for the concatenation name. If a match is found, the lookup process may return a positive result, and may be configured to continue searching for more matches, such as when looking for all versions of the target item. The saveset record file (or index for that record file, such as a filename key file) corresponding to that savepoint may then be opened and searched for the target item name. If no match is found, the lookup process may then move to the next saveset that might contain the target, and repeat the above method.

Figure 5:
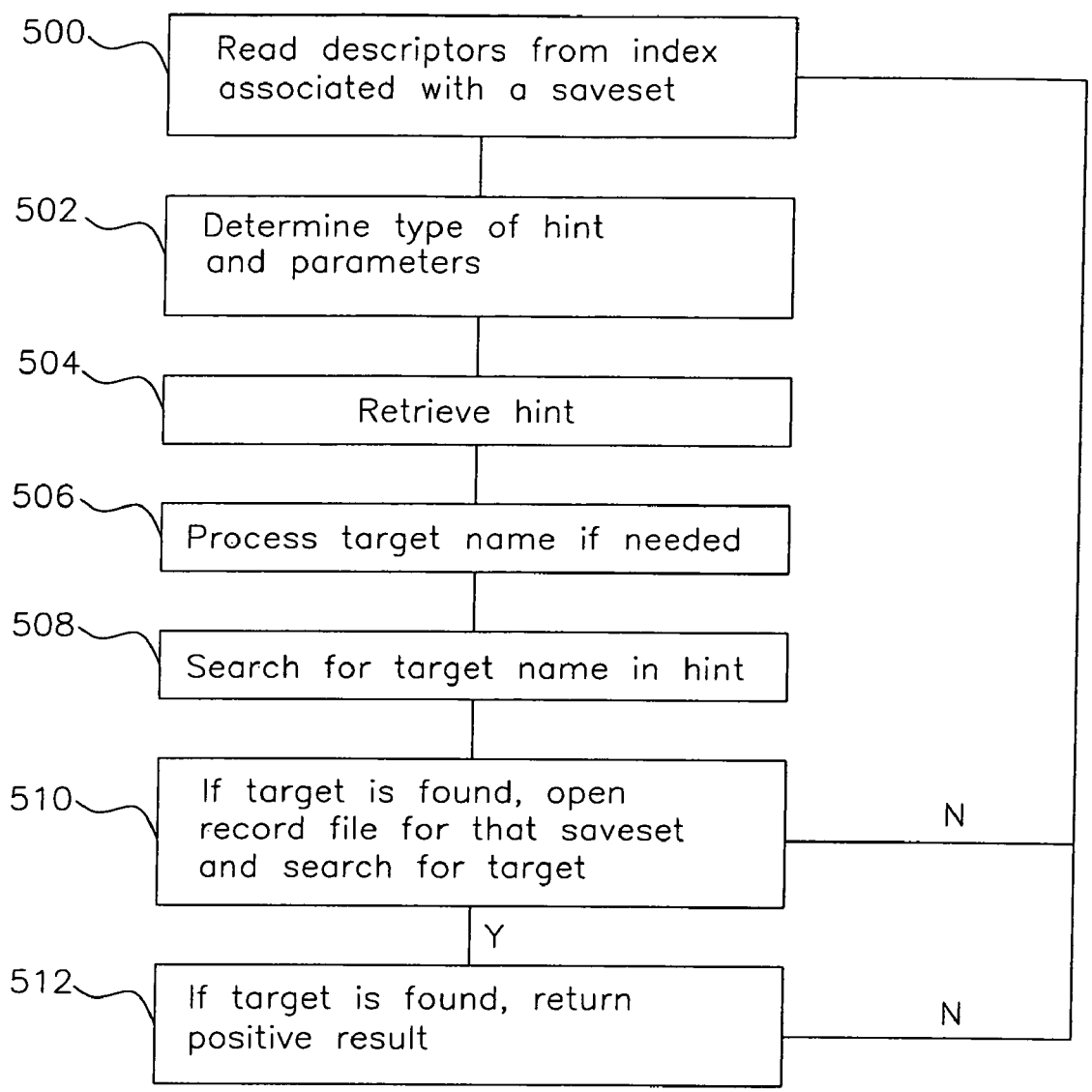
FIG. 5 is a flowchart illustrating a process for looking up a target object name using a hint produced by concatenation of object names.

An embodiment of this process is illustrated in FIG. 5. The descriptors (such as the savepoint) associated with a saveset are read from the index, step 500, and the flags and hint parameters are determined, step 502. The hint is retrieved from the savepoint, step 504. The target name is processed (if needed), step 506. For example, it may be processed to determine the first n characters, last n characters, etc. This processed target name is then checked against the hint to determine whether it is present, step 508, and if there is a match, the record file (such as the filename key file that indexes the record file) is opened and searched for the target, step 510. The search in the filename key file may seek the full target name rather than the processed target name. If the target is found, a positive result is returned, step 512. If the processed target name is not found in the hint or the target name is not found in the filename key file, the process moves to the next saveset descriptors in the index and repeats, step 500.

Hashing may be performed on item names before concatenation. An embodiment may include applying a hash function to the item names and concatenating the hashed values of the item names. In an embodiment, the hash function may be:

$$h(k) = k \bmod m$$

where m is the table size and k is the hash value of the backup item. The hash value of the backup item is calculated using a polynomial hash function using Horner's rule. The value of m may be chosen based on the number of bytes to be used for storing each key (e.g., if 4 bytes are used, m would be $2^{32}-1$). The value of m may be stored as a parameter of the hint. It is advantageous to choose a prime number for the table size, since hash tables of prime size tend to perform much better than hash tables of non-prime size. In an embodiment, m may be chosen as the largest prime number smaller than the maximum size of the table (which is limited by the amount of space allocated). A larger table size will reduce the risk of collisions that occur when two distinct item names produce the same hash value.

To illustrate, suppose the savepoint has space for 1010 characters allocated, 10 of which are used to store the identification of the hint, hint parameters, and other useful information. The saveset in this example might consist of 500 objects. If 2 bytes are used for the hash value, the table size variable m may then be set to the largest prime number that can fit in 2 bytes. The largest number that can be stored in 2 bytes is $2^{16}=65536$, and the largest prime smaller than 65536 is 65521. 1000 bytes will be available to store the 500 hash values, assuming that 1 byte is used to store 1 character. The remaining 10 bytes can be used to store the hint identification, and the number "2" (indicating that 2 bytes have been used for each hash value) and/or the number "65521" (indicating the value of m).

Three bytes may be used for each hash value, independently of the number of backup objects in the saveset. In this case, since the largest number that can be stored in 3 bytes is $2^{24}=16777216$, m would be 16777213 (the largest prime number smaller than 16777216). With these parameters, this method would be applicable for savesets consisting of at most 333 objects, since the hash value of each object occupies 3 bytes and 1000 bytes are available for storing the hash values.

The disclosed hash function has been determined to work well, though any hash function could be used to implement this method. Horner's Rule may be used to convert the item name to an integer. In an embodiment, the hash values may be calculated by interpreting the characters in backup item name as coefficients of a polynomial in one variable, and then evaluating the polynomial for x=231:

$$s[0]*x^k+s[1]*x^{k-1}+s[2]*x^{k-2}\ldots s[k-1]*x^1+s[k]*x^0$$

$$s[0]*231^k+s[1]*231^{k-1}+s[2]*231^{k-2}+\ldots+s[k-1]*231^1+s[k]*231^0$$

Other values for the polynomial's variable may be used instead of 231. For example, the values 33, 37, 39, 41 and 131 have been reported by experimental studies such as "Algorithm Design: Foundations, Analysis and Internet Examples" [M. T. Goodrich, R. Tamasia, 2002] and "Handbook of Algorithms and Data Structures in Pascal and C" [G. H. Gonnet, 1991], the disclosures of which are hereby incorporated herein by reference. Some applications may generate object names for which a particular value for the polynomial's variable works well. The hash value of the backup item name would be the above computed value, mod m, where m is the size of the hash table.

An implementation of Horner's Rule for computing the hash function described above could be as follows:

```
int hash (char key[KeyLength])
{
    int h=0;
    int i;

for (i=0; i<KeyLength ; i++)
    {
        h=(231*h+key[i]) % TableSize;
    }
    return h;
}
```

As each item is saved by the backup process, its name is passed to the hash function, and the result concatenated into the savepoint. Hash values may be stored sequentially in the savepoint in a first-in-first-out fashion, or some other ordering may be used such as placing the hash values for the most recently used or modified items first. Although delimiters may be used between each hash value in the concatenation, a fixed hash value size obviates the need for delimiters, and without delimiters, more space would be available for storing hash values.

In an embodiment, the concatenated hash values are stored in the savepoint field, along with flags to indicate the optimization algorithm being used. This approach is advantageous in that hash values will have fixed sizes, so it will be known in advance how many bits will be needed for each hash value. An example is illustrated in FIG. 3B. In an embodiment, the hashed value could include other information associated with the item, such as savetime, timestamp of last modification to the item, all or part of the content of the item, etc. For example, the item name and timestamp of last modification could be concatenated and then hashed, and the resulting hash value stored in the savepoint as part of the concatenation.

Figure 6:
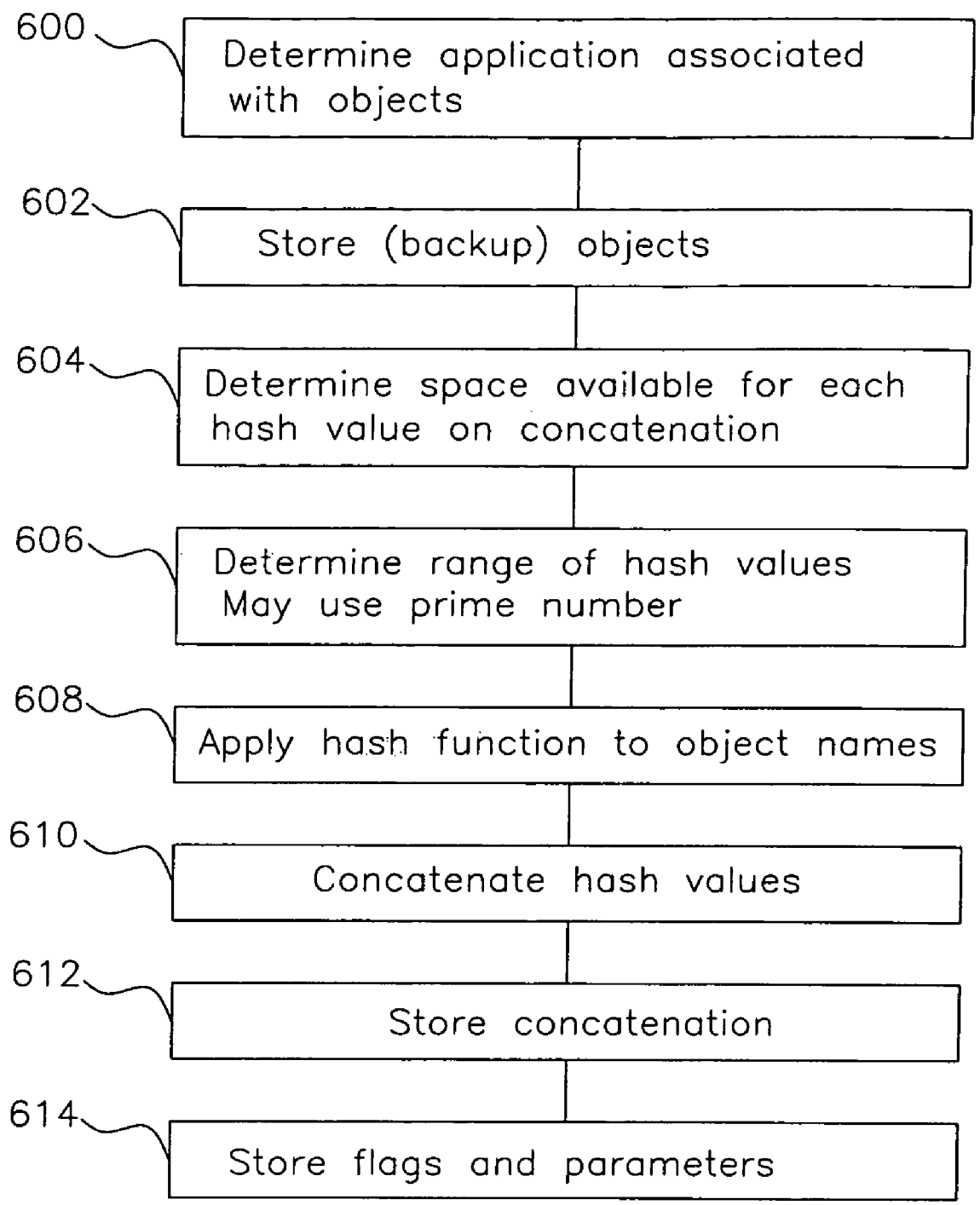
FIG. 6 is a flowchart illustrating a process for producing a hint using concatenation of hashed values.

FIG. 6 illustrates an embodiment of the process. In step 600, it is determined what application is associated with the objects. This can be performed at other stages of the process, and this determination may be implicit; i.e., a backup client 102 may be application-specific and already know what kind of objects it is processing. The backup is performed, step 602, and the space available for each hash value in the concatenation is calculated, step 604. The process determines the range of hash values to use, step 606. This determination may be made based on the amount of space available for storing the concatenation (e.g., the size of the savepoint field minus the size of the flags/parameters), and the maximum end of the range could be the largest prime number smaller than the largest number that can be represented by the space available. For example, if there are 24 bits available for storing the hash value, the largest number that can be represented is $2^{24}=16777216$. The object names are hashed, step 608, and the hash values are concatenated, step 610. They may be concatenated in first-in, first-out order or some other sequence such as an ordering based on most recent use or modification. In step 612, the concatenation is stored as a hint. The hint may be stored in the index header file in place of the savepoint or in another part of the descriptors for the saveset. Flags may be included with the hint to indicate what type of hint was used and the parameters, step 614.

In an embodiment, the lookup process retrieves the savepoint for a candidate saveset in the index header file, and examines the flags in the savepoint to determine which optimization algorithm, if any, was used. When the use of concatenated hashed values is detected, the name of the target is hashed to produce a target hash value. The lookup process may search the concatenated hash values looking for a match to the target hash value. If a match is found, the lookup process may return a positive result, and may be configured to continue searching for more matches, such as when looking for all versions of the target item. The saveset record file (or index for that record file, such as a filename key file) corresponding to that savepoint may then be opened and searched for the target item name. A positive match may be returned due to the presence of an item name having the same hash value as the name of the target item being sought. If no match is found, the lookup process may then move to the next saveset that might contain the target, and repeat the above method.

Figure 7:
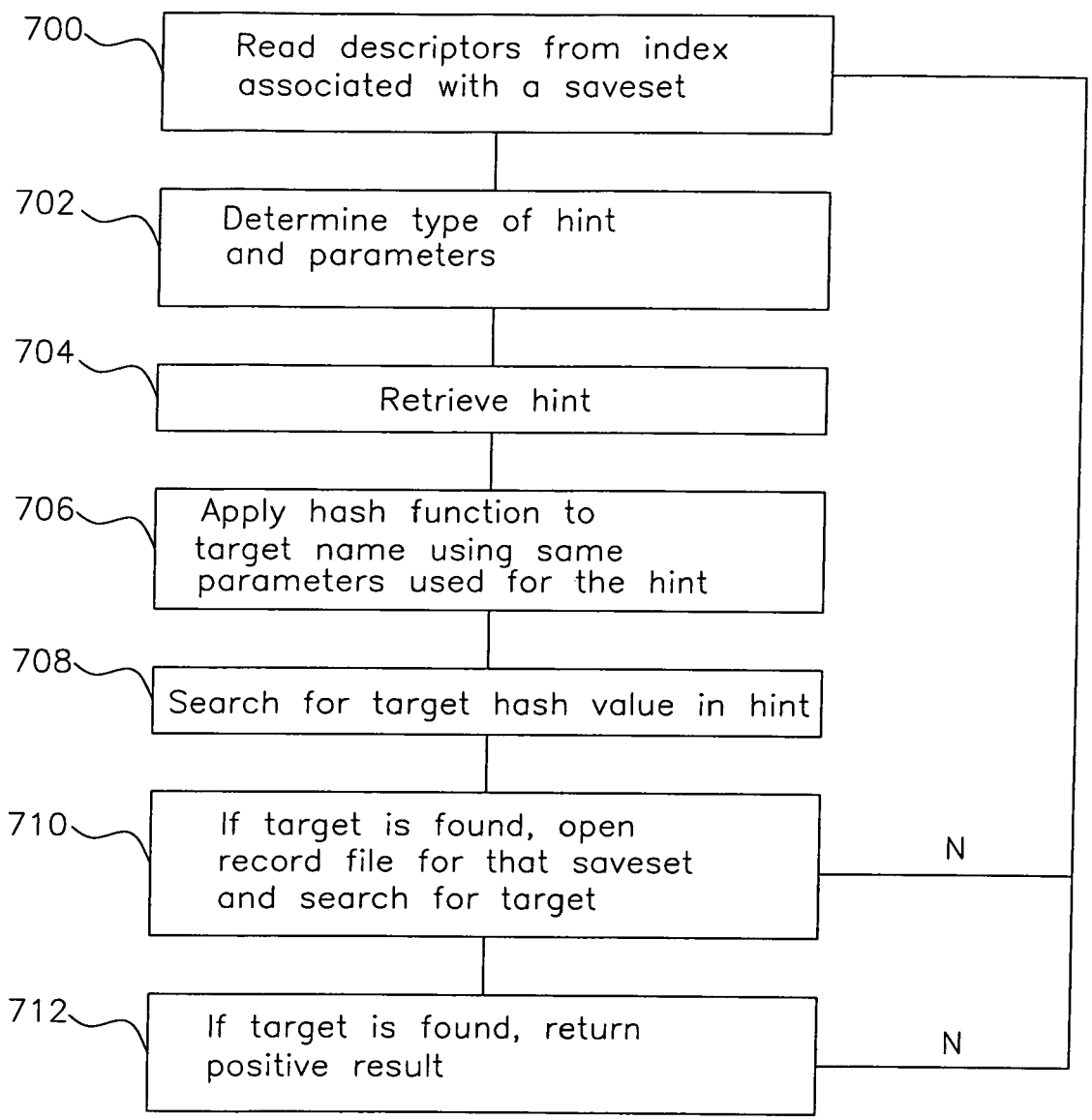
FIG. 7 is a flowchart illustrating a process for looking up a target object name using a hint produced by concatenation of hash values.

FIG. 7 shows an embodiment of the process. The descriptors (such as the savepoint) associated with a saveset are read from the index, step 700, and the flags and hint parameters are determined, step 702. The hint is retrieved from the savepoint, step 704. The target name is hashed, step 706, using the same hash function and parameters as used to produce the hint. This hashed target name is then checked against the hint to determine whether it is present, step 708, and if there is a match, the record file (such as the filename key file that indexes the record file) is opened and searched for the target, step 710. The search in the filename key file may seek the full target name rather than the hashed target name. If the target is found, a positive result is returned, step 712. If the hash value of the target name is not found in the hint or the target name is not found in the filename key file, the process moves to the next saveset descriptors in the index and repeats, step 700.

To keep the index header file from becoming unwieldy, the amount of space allocated to the savepoint field may be limited. The savepoint may, for example, be 4095 characters long. This limits the use of the above-disclosed hints/optimization algorithms to savesets that do not contain too many backup items. In an embodiment, the names of the backup items are hashed as described herein, and mapped into a bitmap array.

For example, each backup item's name may be hashed to an integer k between 0 and 4095*CHAR_BITS, and the $k^{th}$ bit in the bitmap array will be turned ON (i.e., set to 1, but may be set to 0 if active low is chosen). If flags are used to indicate what hint is being used and the parameters for the hint (collectively referred to as "hint-keywords"), and those flags are stored in the savepoint field, this will reduce the amount of space available for the bitmap array, and the range will be between 0 and (4095−sizeof(hint-keywords))*CHAR_BITS. CHAR_BITS indicates the number of bits used to represent a character, typically 1 byte=8 bits. Thus, if 5 bytes are used to store hint-keywords, there will be 4090 bytes, or 4090*8=32720 bits. Then the hash function would be h(k)=k mod 32720, mapping each backup item name to a number between 0 and 32719, and setting the corresponding bit of the bitmap array to ON. In an embodiment, the range should be between 0 and the largest prime number that will fit the allocated space, because prime numbers result in more even distribution of numbers over the hash table and clustering is minimized.

FIG. 3C illustrates an embodiment of the bitmap array of hash values. As shown in the figure, each bit position corresponds to a hash value, up to k where k is the maximum hash value allowed (which is dependent on the amount of space allocated).

Figure 8:
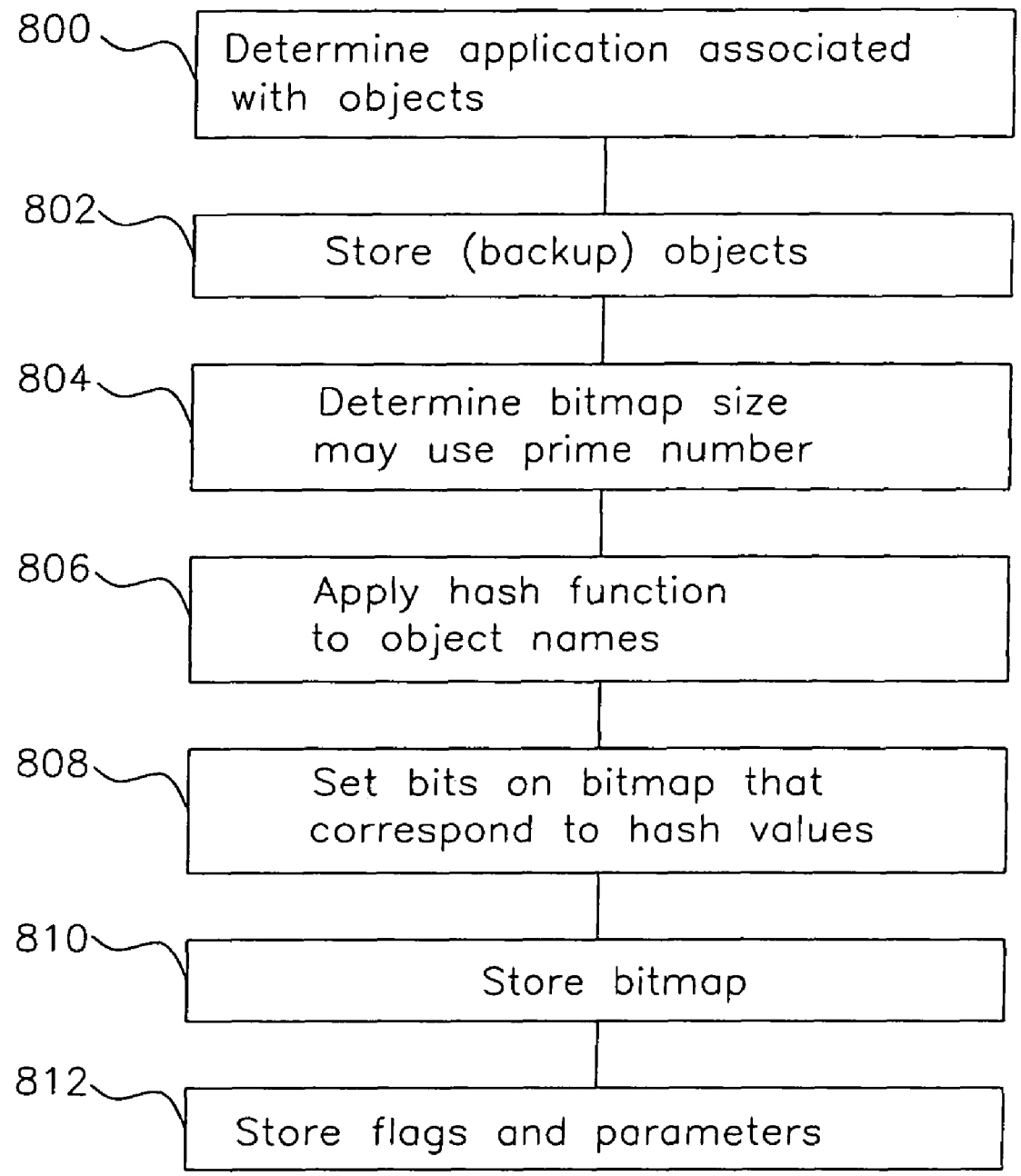
FIG. 8 is a flowchart illustrating a process for producing a hint using a bitmap of hashed values.

FIG. 8 illustrates an embodiment of the process. In step 800, it is determined what application is associated with the objects. This can be performed at other stages of the process, and this determination may be implicit; i.e., a backup client 102 may be application-specific and already know what kind of objects it is processing. The backup is performed, step 802, and the bitmap size calculated, step 804. This determination may be made based on the amount of space available for storing the bitmap (e.g., the size of the savepoint field minus the size of the flags/parameters), and the maximum end of the range could be the largest prime number smaller than the size of the space available. The object names are hashed, step 806, and the bits in the bitmap that correspond to the hash values are set to ON, step 808. In step 810, the bitmap is stored as a hint. The hint may be stored in the index header file in place of the savepoint or in another part of the descriptors for the saveset. Flags may be included with the hint to indicate what type of hint was used and the parameters, step 812.

When the savepoint is retrieved from the index header files and the flags are determined to indicate that a bitmap array of hash values is stored in the savepoint, the lookup process computes the hash value of the target item name. This value is used to index into the bitmap array, and a simple check is performed to determine whether the bit at that position is set to ON. If the bit is ON, a positive result is returned. The saveset record file (or index for that record file, such as a filename key file) corresponding to that savepoint may then be opened and searched for the target item name. A collision ("false positive") may occur even though the probability is relatively low, and a positive match in the bitmap array may be triggered by the presence of an item name having the same hash value as the name of the target item being sought. If no match is found, the lookup process may then move to the next saveset that might contain the target, and repeat the above method.

Figure 9:
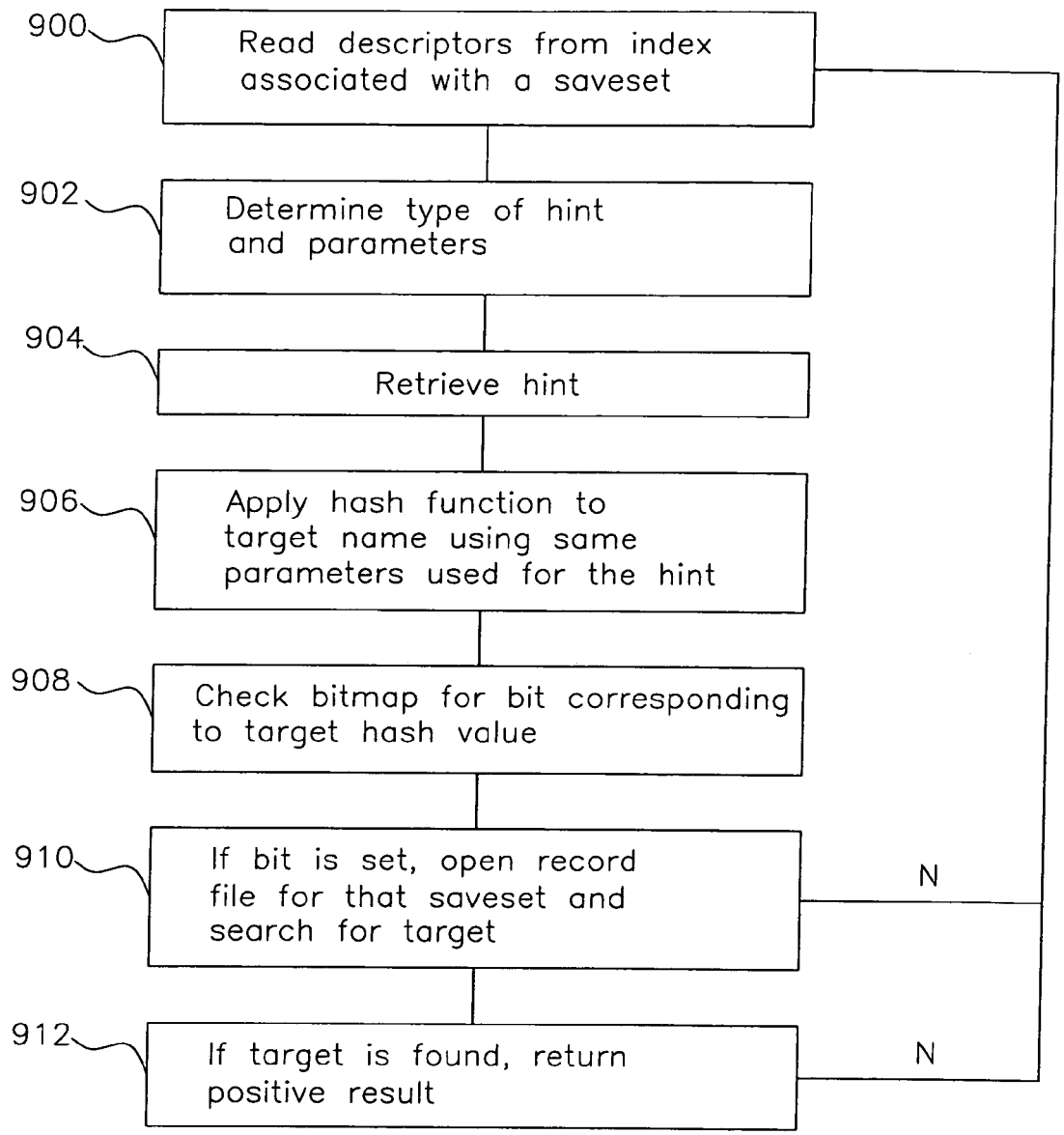
FIG. 9 is a flowchart illustrating a process for looking up a target object name using a bitmap of hash values.

An embodiment of the process is shown in FIG. 9. The descriptors (such as the savepoint) associated with a saveset are read from the index, step 900, and the flags and hint parameters are determined, step 902. The hint is retrieved from the savepoint, step 904. The target name is hashed, step 906, using the same hash function and parameters as used to produce the hint. The bit in the bitmap corresponding to the target hash value is checked to determine whether it is set, step 908, and if it is set, the record file (such as the filename key file that indexes the record file) is opened and searched for the target, step 910. The search in the filename key file may seek the full target name rather than the target hash value. If the target is found, a positive result is returned, step 912. If the bit corresponding to the hash value of the target name is not set or the target name is not found in the filename key file, the process moves to the next saveset descriptors in the index and repeats, step 900.

In an embodiment, a backup process might use any of several hints/search optimization algorithms, and use flags to indicate which algorithm was selected. This decision may be made by the client 102 or server 108. In an embodiment, client 102 has information about the objects that it is backing up and what application(s) created them, and may use that information to determine what backup method to use. If the backup item names fit into the savepoint, concatenation of the item names can be performed as described herein. Methods of shortening the item names can be used, such as storing the first or last n characters of each item name, or using every $k^{th}$ character of each item name. If the backup item names will not fit into the savepoint using the concatenation methods described herein with an acceptable level of distinctiveness, hashing of item names may be performed as described herein. Hashed values may be concatenated or stored into a bitmap array. Concatenating hash values may produce fewer collisions, if the range of the hash function is greater than when used with the bitmap array, but at the expense of fewer hash values that can be stored in the savepoint without having too many collisions.

For example, if the backup client 102 of an application knows that, because of the application it's backing up, no backup item will ever have a name longer than 64 chars and no saveset will ever contain more than 10 backup items, then it may determine that concatenating all names of backup items is the best solution. This would be the case if the client index file entry had 4095 characters allocated, because 10×64=650 characters, which will easily fit. Any form of hashing would introduce the possibility of false positives. In this case, the backup client 102 would store a flag indicating that the item names were concatenated and other parameters (such as a fixed filename length), as well as a concatenation of the names of all backup items. When a process searches the client file index, it checks to see if a flag for any hint has been set; if it sees no flag, it knows that the standard savepoint (e.g., the longest pathname containing all of the items) has been stored in the client file index entry; if it sees a flag that indicates any of the hints, it knows how to interpret the rest of the client file index entry.

Figure 10:
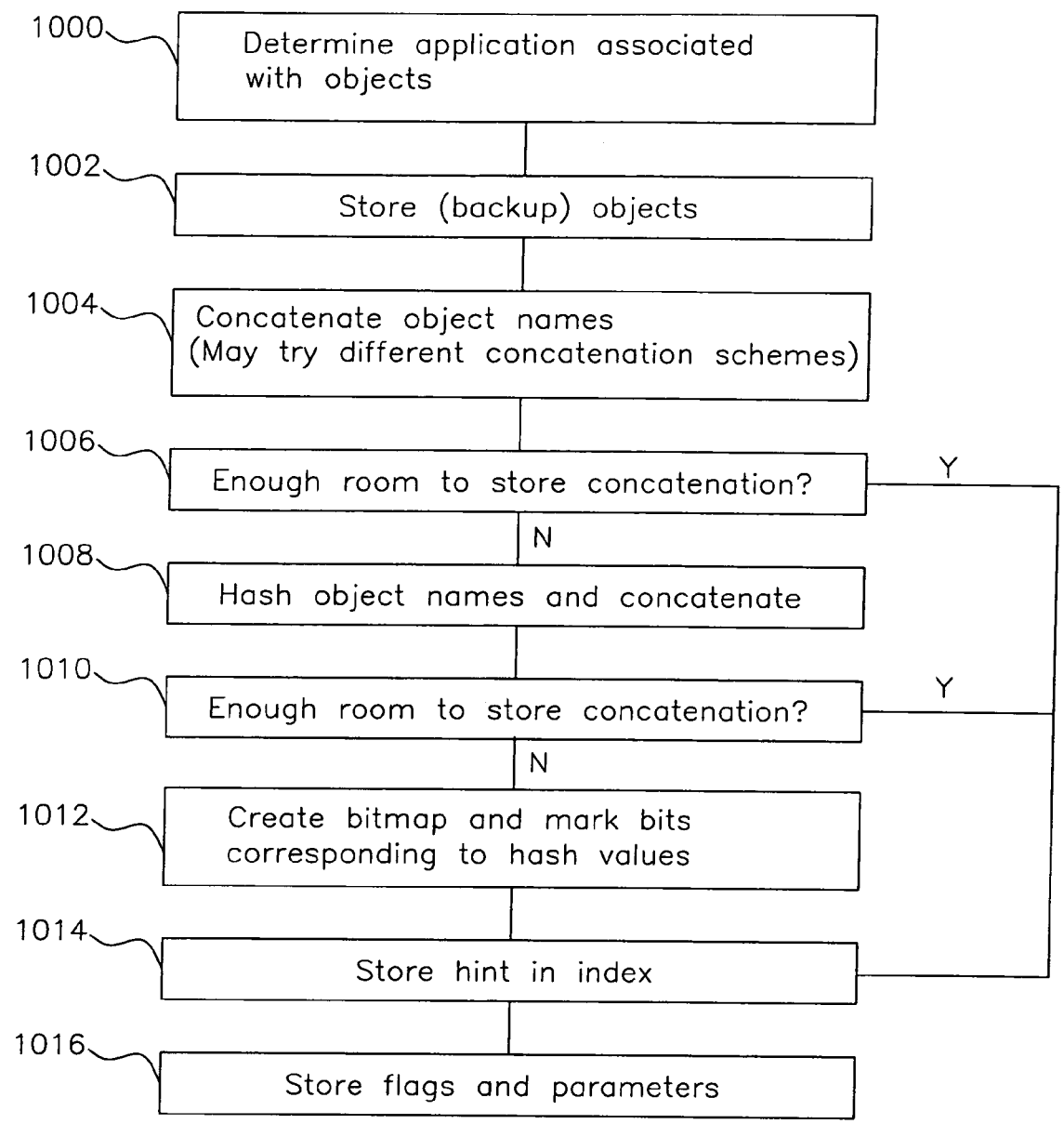
FIG. 10 is a flowchart illustrating a process for utilizing an optimization hint.

Use of an adaptive process as described herein enables a system running a backup process to automatically choose an appropriate search optimization algorithm, taking into account the number of backup items it finds in a saveset and the application associated with the objects, shown as step 1000 in FIG. 10. Objects are backed up, step 1002. In an embodiment, the system first tries to concatenate the names of all backup items, step 1004. It should be understood that this process may be performed in parallel with the store operations (i.e., concatenate object names as objects are identified and stored). This minimizes this way the number of false positives that may occur during a client file index lookup. A "false positive" is a match in the header file, which necessitates the lookup of the record file, but whose lookup results in no matches, thereby wasting time, so it is desirable to minimize the occurrence of false positives. If the client file index entry (such as the savepoint field) does not have enough space to store the concatenation of all backup item names, step 1006, the system attempts to concatenate the hash values of all backup item names, step 1008. Such a concatenation of the hash values can accommodate more backup items per saveset than the concatenation of the names themselves, but (a) there is still a maximum number of backup items per saveset it can accommodate (b) it introduces the likelihood of some false positives, unlike the previous method. If the client file index entry does not have enough space to store even the concatenation of the hash values of all backup item names, step 1010, the system uses the bitmap hash table approach in step 1012. This approach can accommodate savesets of an arbitrary number of backup items, at the expense of increasing the expected number of false positives. Regardless of which approach is chosen, the hint is stored in the index, step 1014, and flags and parameters associated with the hint are stored as well, step 1016. These functions may be performed by client 102, server 108, or some other component in the system, and the principles disclosed herein apply equally to all configurations.

Regardless of the approach chosen, the hint may be stored in the savepoint field of the index as described herein. In some embodiments, a reader such as a string stream reader may be used to read the index or saveset record. The string stream reader may be configured to read data until a flag is seen, such as a special byte or sequence of bytes, and this is assumed to be the end of the stream. Thus, the flag may signify an endpoint used to terminate the read. The flag may, for example, be a null byte (a byte whose bits are all set to 0), and when the null byte is encountered, the reader stops reading. If this null byte or other special byte is generated and stored as a hint in the index, the reader may stop reading prematurely when it encounters the null or special byte in the hint, before the end of the string or record has been reached. This may be handled by ensuring that the hint does not generate a sequence of bits or bytes (the prohibited flag) that would cause the reader to stop prematurely.

In one embodiment, a search optimization is used that involves hashing the name of each backup item (which may be stored in a filename string) to an integer k between 0 and $2^{32}-1$, and concatenating k to the other hash values in the savepoint, as described herein. The hash value k may be represented in 4 bytes. If a null byte is used to represent the end of the string, then it is desirable to avoid a 0 value (which corresponds to a null byte) in any of these 4 bytes. In some cases, such as in legacy applications or to maintain compatibility, it may be impractical to change the method of signaling the end of the string or record.

Referring to FIG. 11a, a hash value is illustrated as comprising 4 bytes. Each 8-bit byte can represent 256 values between 0-255. Blocks a, b, c, and d each represent one byte, and each byte can contain a value between 0-255 (i.e. $0 \leq value \leq 255$). Block a is the least significant byte, and d is the most significant byte. The integer value M represented by this 4-byte value is calculated as follows:

$$M=a*256^0+b*256^1+c*256^2+d*256^3$$

Because a null byte must be avoided in order to avoid conflict with the reader, bytes a, b, c, or d cannot be 0 for the hash value representation. This means that no byte can have the value of 0; each byte can only have 255 values between 1-255 (0 is discarded). This is similar to using one byte to encode 255 values between 0-254, and replacing any resultant 0-valued byte with a value of 255. Base-255 encoding never generates 255 as the value of the byte, and therefore, this approach could safely replace any byte with the value of 0, with the value of 255.

However, all of the key values k cannot be represented using only the 255 values in each byte of 4 bytes in this encoding scheme. The maximum integer value that can be represented by this encoding is $255^4+1=4228250624$, which is smaller than the maximum value of k ($256^4-1=4294967295$). Because the difference between k's maximum value and the maximum value represented by 4 bytes using new 255-based encoding is 66716669, and this difference is smaller than $1*255^4$, only one extra bit is needed at the most significant end of the 4-byte value. This would entail dividing byte boundaries, however, and an extra byte may be used instead of an extra bit. The hash value may thus be represented by 5 bytes instead of 4 bytes, and encoded in base-255 such that each byte can encode a value between 0-254 (i.e. $0 \leq value \leq 254$), as illustrated in FIG. 11b, in which block e' representing the new most significant byte has been utilized. The integer value M' represented by this 5-byte value using base-255 encoding is then:

$$M'=a'*255^0+b'*255^1+c'*255^2+d'*255^3+e'*255^4$$

As described herein, the base-255 encoding may generate bytes with a value of 0, each of which may safely be replaced with a byte having a value of 255 (because base-255 encoding will never produce 255 as a value). Thus, a 0 may be written as a 255, and conversely, a 255 may be read as a 0 when the index is read.

For example, suppose a string (such as a backup item name) hashes to k=16777216. Normal base-256 encoding will result in the 4 bytes shown in FIG. 11c. As shown in the figure, the first three bytes are 0. Encoding the 4 bytes into base-255 and using 5 bytes to represent the result produces the 5-byte sequence shown in FIG. 11d:

$$M'=1*255^0+3*255^1+3*255^2+1*255^3+0*255^4$$

Each byte with value 0 is mapped to 255. The result is shown in the 5-byte sequence in FIG. 11e.

Figure 12:
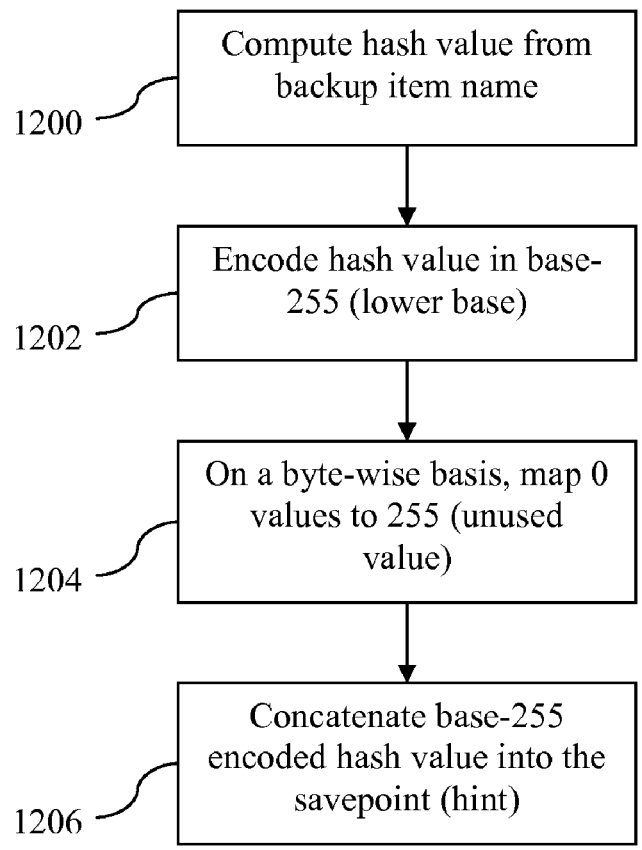
FIG. 12 is a flowchart illustrating a process for encoding hash values.

FIG. 12 illustrates an embodiment. A hash value is computed from the backup item name, step 1200, with a range of values between 0 and $2^{32}-1$. This value may be represented in 5 bytes, and in step 1202, each byte is encoded in base-255. In step 1204, any 0 values in the base-255 encoded bytes are mapped to 255, thereby avoiding any occurrence of a byte with a 0 value. This byte sequence may be concatenated into the savepoint, step 1206. These steps may be performed separately or combined. For example, the mapping of 0 to 255 may be merged with the base-255 encoding.

Figure 13:
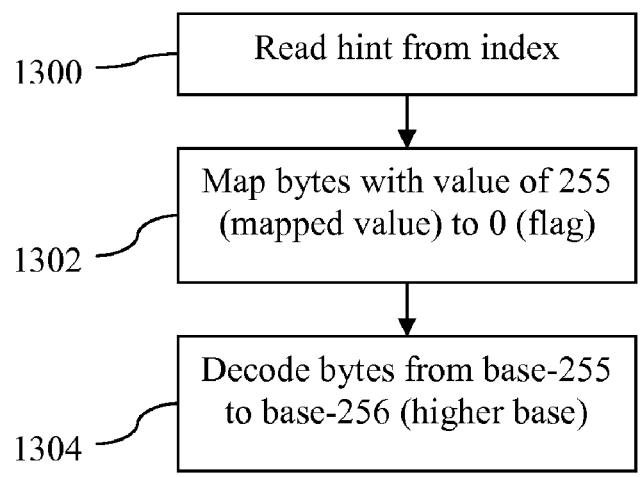
FIG. 13 is a flowchart illustration a process for retrieving encoded hash values.

Referring to FIG. 13, when the index is read, step 1300, such as during backup or restore operations, the reader should not encounter any null bytes in the stored hints. Bytes containing the value 255 are mapped to 0, step 1302, and may be decoded from base-255 to base-256, step 1304, essentially reversing the encoding of the original hash value. After decoding, the most significant byte may no longer be needed for storing the hash value and may be dropped. The decoded hash value may be processed as described herein. For example, it may be used to determine whether an object has been stored.

The foregoing has been described with reference to an embodiment using base-256 values encoded into base-255, and a flag comprising a null byte, but it should be understood that the principles of the invention are not limited to the specific embodiments disclosed herein. A value may be transformed into portions (e.g., bytes), and each portion may be encoded into a base (e.g., base-255) lower than the maximum base (e.g., base-256) that could be represented by each portion (e.g., byte). This leaves unused values that will never be used by the encoding, and those unused values may be mapped to ensure that the flag (the prohibited value) never appears in the hint.

Although the methods and systems herein have been described with respect to an illustrative embodiment, it should be appreciated that the methods and systems disclosed are independent of the precise architecture of the backup system or object storage system used, and are applicable to mass storage, tape storage, optical devices, and all other types of systems that process data in the form of files or other objects.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer.

Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A computer implemented method of tracking a plurality of objects being stored in a storage device, wherein information about the plurality of objects is stored in a plurality of first layers and a plurality of second layers, each first layer consisting of an index header and each second layer consisting of a keyfile, comprising:

determining an application associated with the plurality of objects;

selecting a hint for locating the plurality of objects, wherein selecting the hint is based on determining the application associated with the plurality of objects, and wherein the hint includes at least one of a group comprising a concatenation of object names, a concatenation of hash values, and a bitmap array;

searching the plurality of first layers with the selected hint to determine the second layer to search;

searching the determined second layer for a target; and storing the results of the first and second search in a storage device.

2. The computer implemented method as recited in claim 1, wherein selecting the hint includes selecting the hint from a group comprising at least one hint.

3. The computer implemented method as recited in claim 2, further comprising generating the at least one hint by concatenating at least a portion of a name of each object being stored into the hint, to produce a concatenation of at least portions of the names of objects.

4. The computer implemented method as recited in claim 3, wherein concatenating at least a portion of a name of each object into the hint includes concatenating the name of each object into the hint.

5. The computer implemented method as recited in claim 3, wherein concatenating at least a portion of a name of each object into the hint includes selecting a portion of the name of each object.

6. The computer implemented method as recited in claim 3, further comprising determining whether the concatenation of at least portions of names of objects will fit into a space available for storing the concatenation.

7. The computer implemented method as recited in claim 6, further comprising generating at least one hint by applying a hash function to a name of each object to generate a hash value, and concatenating each hash value into the hint to produce a concatenation of hash values upon determining that the concatenation of at least portions of names of objects will not fit into the space available.

8. The computer implemented method as recited in claim 7, further comprising determining whether the concatenation of hash values will fit into a space available for storing the concatenation.

9. The computer implemented method as recited in claim 8, further comprising generating at least one hint by providing a bitmap array, applying a hash function to a name of each object to generate a hash value, and setting at least one bit in the bitmap array that corresponds to at least one hash value upon determining that the concatenation of hash values will not fit into the space available.

10. The computer implemented method as recited in claim 9, wherein the plurality of objects is associated with a saveset, and the hint is associated with the saveset.

11. The computer implemented method as recited in claim 10, wherein the index comprises descriptors for a plurality of savesets, and storing the hint includes storing the hint in one of the descriptors.

12. The computer implemented method as recited in claim 2, further comprising generating the at least one hint by applying a hash function to a name of each object to generate a hash value, and concatenating each hash value into the hint.

13. The computer implemented method as recited in claim 12, wherein generating the hint includes determining an amount of space to be allocated to each hash value.

14. The computer implemented method as recited in claim 13, wherein determining the amount of space to be allocated to each hash value includes dividing a number of the objects in the plurality of the objects into a space available for storing the concatenation.

15. The computer implemented method as recited in claim 2, further comprising generating the at least one hint by providing a bitmap array, applying a hash function to a name of each object to generate a hash value, and setting at least one bit in the bitmap array that corresponds to at least one hash value.

16. The computer implemented method as recited in claim 15, further comprising determining a size of the bitmap array.

17. The computer implemented method as recited in claim 16, wherein determining the size of the bitmap array includes choosing a largest prime number smaller than a space available for storing the bitmap array.

18. The computer implemented method as recited in claim 17, further comprising generating the at least one hint by:

concatenating at least a portion of a name of each object being stored into the hint;

applying a hash function to a name of each object to generate a hash value, and concatenating each hash value into the hint; or providing a bitmap array, applying a hash function to a name of each object to generate a hash value, and setting at least one bit in the bitmap array that corresponds to at least one hash value.

19. A computer storage medium containing computer readable instructions for tracking a plurality of objects being stored, wherein information about the plurality of objects is stored in a plurality of first layers and a plurality of second layers, each first layer consisting of an index header and each second layer consisting of a keyfile, the computer readable instructions comprising:

computer program code for determining an application associated with the plurality of objects;

computer program code for selecting a hint for locating the plurality of objects, wherein selecting the hint is based on determining the application associated with the plurality of objects, and wherein the hint is generated by:

concatenating at least a portion of a name of each object being stored into the hint;

applying a hash function to a name of each object to generate a hash value, and concatenating each hash value into the hint; or providing a bitmap array, applying a hash function to a name of each object to generate a hash value, and setting at least one bit in the bitmap array that corresponds to at least one hash value;

computer program code for searching the plurality of first layers with the selected hint to determine the second layer to search;

computer program code for searching the determined second layer for a target; and storing the results of the first and second search in a storage device.

* * * * *